US011930056B1

(12) United States Patent
Ren et al.

(10) Patent No.: US 11,930,056 B1
(45) Date of Patent: Mar. 12, 2024

(54) REDUCING NOISE FOR ONLINE MEETINGS (71) Applicant: INTERNATIONAL BUSINESS MACHINES CORPORATION, Armonk, NY (US)

(72) Inventors: Jing Ren, Beijing (CN); Jing Wen Chen, Beijing (CN); Zhao Yu Wang, Beijing (CN); Xizhuo Zhang, Beijing (CN); Yi Jie Ma, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/169,424

(22) Filed: Feb. 15, 2023

(51) Int. Cl.
*H04L 65/4038* (2022.01)
(52) U.S. Cl.
CPC ................. *H04L 65/4038* (2013.01)
(58) Field of Classification Search
CPC ............. H04L 65/4038; H04L 12/1822; H04L 12/185; H04N 7/152
See application file for complete search history.

(56) References Cited

U.S. PATENT DOCUMENTS

| | | | |
|---|---|---|---|
| 9,338,400 B1 * | 5/2016 | Krishnan | H04L 12/185 |
| 10,044,871 B2 * | 8/2018 | Bargetzi | H04L 12/1818 |
| 11,373,669 B2 | 6/2022 | Kawai | |
| 11,404,073 B1 | 8/2022 | Zhang | |
| 11,665,284 B2 * | 5/2023 | Jorasch | H04N 7/147 |
| | | | 709/204 |
| 2008/0117838 A1 | 5/2008 | Yee | |
| 2015/0124950 A1 | 5/2015 | Koenig | |
| 2017/0351402 A1 * | 12/2017 | Yoakum | G06Q 10/00 |
| 2018/0349086 A1 | 12/2018 | Chakra | |
| 2019/0386840 A1 * | 12/2019 | Griffin | H04L 12/1831 |

(Continued)

FOREIGN PATENT DOCUMENTS

EP       2715972 B1       2/2016

OTHER PUBLICATIONS

Gronil et al., "Android, Java ME and Windows Mobile Interplay: The Case of a Context-Aware Meeting Room", 24th International Conference on Advance Information Networking and Applications Workshops, Apr. 20-23, 2010, IEEE Publlishing.*

(Continued)

*Primary Examiner* — Todd L Barker
(74) *Attorney, Agent, or Firm* — Daniel G. DeLuca (57) ABSTRACT

An embodiment for automatically controlling peripheral devices based on online meeting participant information. The embodiment may detect participants of an online meeting and generate a participant information table. The embodiment may generate a participant group table including one or more preliminary participant groups based on the participant information. The embodiment may generate and send audio through peripheral devices associated with at least one participant in each of the one or more preliminary participant groups to identify the participants in physically shared meeting spaces. The embodiment may update the participant group table to include confirmed participant groups based on the identified participants in the physically shared meeting spaces. The embodiment may determine a presenter for each of the confirmed participant groups and update the participant information. The embodiment may control, for the confirmed participant groups, the peripheral devices of the identified participants in the physically shared meeting.

20 Claims, 4 Drawing Sheets

(56) References Cited

U.S. PATENT DOCUMENTS

2021/0400142 A1* 12/2021 Jorasch ................ H04M 3/567
2022/0303502 A1    9/2022 Fisher

OTHER PUBLICATIONS

He et al., "CollabVR: A Reconifgurable Framework for Creative Collaboration in Virtual Reality", IEEE International Symposium on Mixed and Augmented Reality, Nov. 9-13, 2020, IEEE Publishing.*
Roman et al., "Mobile Technology for awareness of time progession and its impact on meetings", International Conference on Collaboration Technologies and Systems, May 20-24, 2013.*
Herskovic et al., "Modeling Groupware for moibile colaborative work", International Conference on Computer Supported Cooperative Work in Design, Apr. 22-24, 2009, IEEE Publlishing.*
3CX, "What is echo cancellation?", 3cx.com, [Accessed on Jan. 5, 2023], 3 Pages. Retrieved from Internet: <https://www.3cx.com/pbx/echo-cancellation/>.
Khan, "Echo in WebRTC; Why?", WebRTC-Experiment.com, [Accessed on Jan. 26, 2023], pp. 1-19. https://www.slideshare.net/MuazKhan/echo-in-webrtc-why.
Shure, "How Does Echo Cancellation Work During a Video Conference?", Shure UK, Sep. 11, 2017, 6 Pages. <https://www.shure.com/en-US/conferencing-meetings/ignite/how-does-echo-cancellation-work-during-a-video-conference>.
Yankelovich, et al., "Meeting central: making distributed meetings more effective", ACM, CSCW'04, Nov. 6-10, 2004, vol. 6, Issue 3, pp. 419-428. <https://dl.acm.org/doi/abs/10.1145/1031607.1031678>.

* cited by examiner

REDUCING NOISE FOR ONLINE MEETINGS

BACKGROUND

The present application relates generally to telecommunications, and more particularly, to reducing noise for online meetings by automatically controlling peripheral devices based on participant information.

Many businesses use online meetings to allow for communication between multiple online meeting participants that are not located in a shared physical workspace. Online meeting participants may each use their own set of peripheral devices, such as microphones and speakers to effectively communicate with other meeting participants in real time. Globalization and the increasingly frequent nature of online communications have made online meetings a common and expected occurrence in the modern office environment.

SUMMARY

According to one embodiment, a method, computer system, and computer program product for automatically controlling peripheral devices based on online meeting participant information is provided. The embodiment may include automatically detecting participants of an online meeting and generating a participant information table including participant information. The embodiment may also include automatically generating a participant group table including one or more preliminary participant groups based on the participant information from the generated participant information table. The embodiment may further include automatically generating and sending audio through peripheral devices associated with at least one participant in each of the one or more preliminary participant groups to identify the participants in physically shared meeting spaces. The embodiment may also include automatically updating the participant group table to include confirmed participant groups based on the identified participants in the physically shared meeting spaces. The embodiment may further include automatically determining presenters for each of the confirmed participant groups and updating the participant information based on the determined presenters. The embodiment may also include automatically controlling, for the confirmed participant groups, the peripheral devices of the identified participants in the physically shared meeting spaces based on the updated participant information.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

In the context of this disclosure, the term "peripheral devices" may include any internal or external device connected to a given participant's computer (or phone, or other digital device used to participate in an online meeting) that are controlled by the participant's computer but are not part of the computer system itself. Peripheral devices may include, for example, microphones, speakers, webcams, headsets, keyboards, mice, monitors, or any other peripheral devices that may be used in the context of online meetings.

Embodiments of the present application relate generally to telecommunications, and more particularly, to reducing noise for online meetings by automatically controlling peripheral devices based on participant information. The following described exemplary embodiments provide a system, method, and program product to, among other things, automatically detect participants of an online meeting and generate a participant information table including participant information, automatically generate a participant group table including one or more preliminary participant groups based on the participant information from the generated participant information table, and automatically generate and send audio through peripheral devices associated with at least one participant in each of the one or more preliminary participant groups to identify the participants in physically shared meeting spaces. The described exemplary embodiments may then automatically update the participant group table to include confirmed participant groups based on the identified participants in the physically shared meeting spaces, automatically determine presenters for each of the confirmed participant groups and update the participant information based on the determined presenters, and automatically control, for the confirmed participant groups, the peripheral devices of the identified participants in the physically shared meeting spaces based on the updated participant information. Therefore, the presently described embodiments have the capacity to improve the experiences of online meeting participants by providing a method of automatically reducing noise or echo by controlling peripheral hardware based on participant information.

As previously described, many businesses use online meetings to allow for communication between multiple online meeting participants that are not located in a shared physical workspace. Online meeting participants may each use their own set of peripheral devices, such as microphones and speakers to effectively communicate with other meeting participants in real time. Globalization and the increasingly frequent nature of online communications have made online meetings a common and expected occurrence in the modern office environment.

Experiencing unwanted 'Noise' during online meetings, such as audio echo or feedback, is a common challenge that negatively affects online meeting participant experiences. Audio echo or feedback is particularly prevalent when multiple participants of a given online meeting are sharing a conference room or workspace. Addressing audio echo or feedback may require manual actions be taken by meeting participants, such as, for example, manually muting microphones, lowering speakers, or using headphones or earplugs in place of speakers. Manual actions may be tedious, inconvenient, and may give rise to human error. Some platforms try to address audio echo or feedback by employing echo reduction techniques or noise suppression solutions. However, these solutions may be unreliable and are not built into all online meeting platforms. For at least the above reasons, it would therefore be desirable for an automated system that is able to improve online meting participant experiences by automatically controlling peripheral hardware based on participant information by eliminating the need for manual actions to be taken by meeting participants and does not rely on any type of potentially unreliable echo reduction or noise suppression techniques.

Accordingly, a method, computer system, and computer program product for improving online meting participant experiences by automatically controlling peripheral hardware based on participant information is provided. The method, system, and computer program product may automatically detect participants of an online meeting and generate a participant information table including participant information. The method, system, computer program product may automatically generate a participant group table including one or more preliminary participant groups based on the participant information from the generated participant information table. The method, system, computer program product may automatically generate and send audio through peripheral devices associated with at least one participant in each of the one or more preliminary participant groups to identify the participants in physically shared meeting spaces. The method, system, computer program product may then automatically update the participant group table to include confirmed participant groups based on the identified participants in the physically shared meeting spaces. Then, the method, system, computer program product may automatically determine presenters for each of the confirmed participant groups and update the participant information based on the determined presenters. Thereafter, the method, system, computer program product may automatically control, for the confirmed participant groups, the peripheral devices of the identified participants in the physically shared meeting spaces based on the updated participant information. In turn, the method, system, computer program product has provided for improved experiences of online meeting participants by automatically controlling peripheral hardware based on participant information. Described embodiments provide for an automated system that does not require manual action be taken by online meeting participants to avoid audio echo or feedback and avoid reliance on echo reduction or noise suppression techniques. Furthermore, the described embodiments perform actions to ensure accurate determinations of which online meeting participants belong to a shared group and which participant is a presenter, thereby allowing the described embodiments to provide for improved automated controlling of peripheral devices for a series of online meeting participants sharing a common meeting space.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
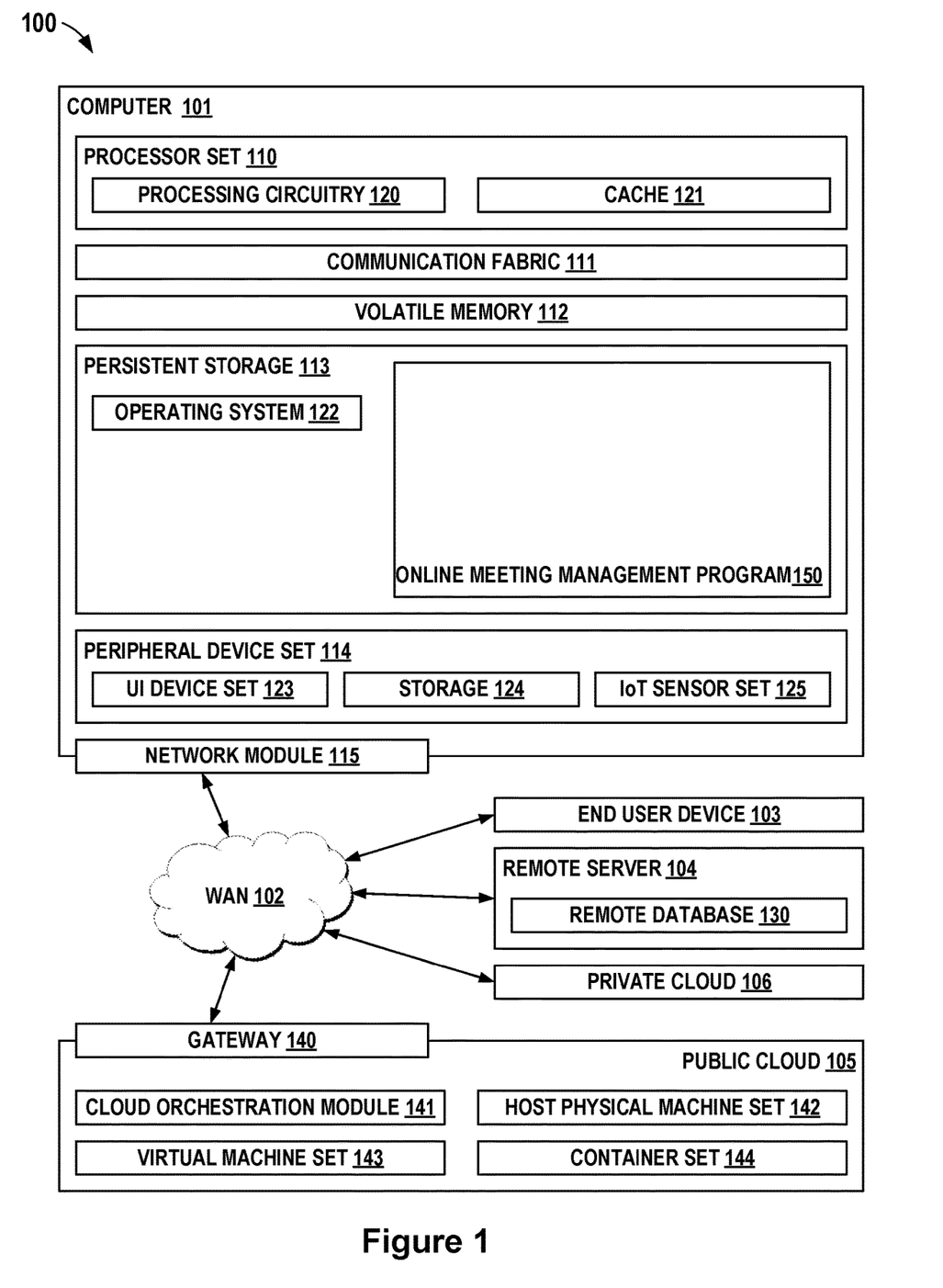
FIG. 1 illustrates an exemplary networked computer environment according to at least one embodiment.

Referring now to FIG. 1, computing environment 100 contains an example of an environment for the execution of at least some of the computer code involved in performing the inventive methods, such as online meeting management program/code 150. In addition to online meeting management code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and online meeting management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in online meeting management code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in online meeting management code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the online meeting management program 150 may be a program capable of automatically detecting participants of an online meeting and generating a participant information table including participant information. Online meeting management program 150 may then automatically generate a participant group table including one or more preliminary participant groups based on the participant information from the generated participant information table. Next, online meeting management program 150 may automatically generate and send audio through peripheral devices associated with at least one participant in each of the one or more preliminary participant groups to identify the participants in physically shared meeting spaces. Online meeting management program 150 may then automatically update the participant group table to include confirmed participant groups based on the identified participants in the physically shared meeting spaces. Next, online meeting management program 150 may automatically determine presenters for each of the confirmed participant groups and update the participant information based on the determined presenters. Thereafter, online meeting management program 150 may automatically control, for the confirmed participant groups, the peripheral devices of the identified participants in the physically shared meeting spaces based on the updated participant information. Described embodiments thus provide for improved experiences of online meeting participants by automatically controlling peripheral hardware based on participant information. Described embodiments provide for an automated system that does not require manual action be taken by online meeting participants to avoid audio echo or feedback and avoid reliance on echo reduction or noise suppression techniques. Furthermore, the described embodiments perform actions to ensure accurate determinations of which online meeting participants belong to a shared group and which participant is a presenter, thereby allowing the described embodiments to provide for improved automated controlling of peripheral devices for a series of online meeting participants sharing a meeting space.

Figure 2:
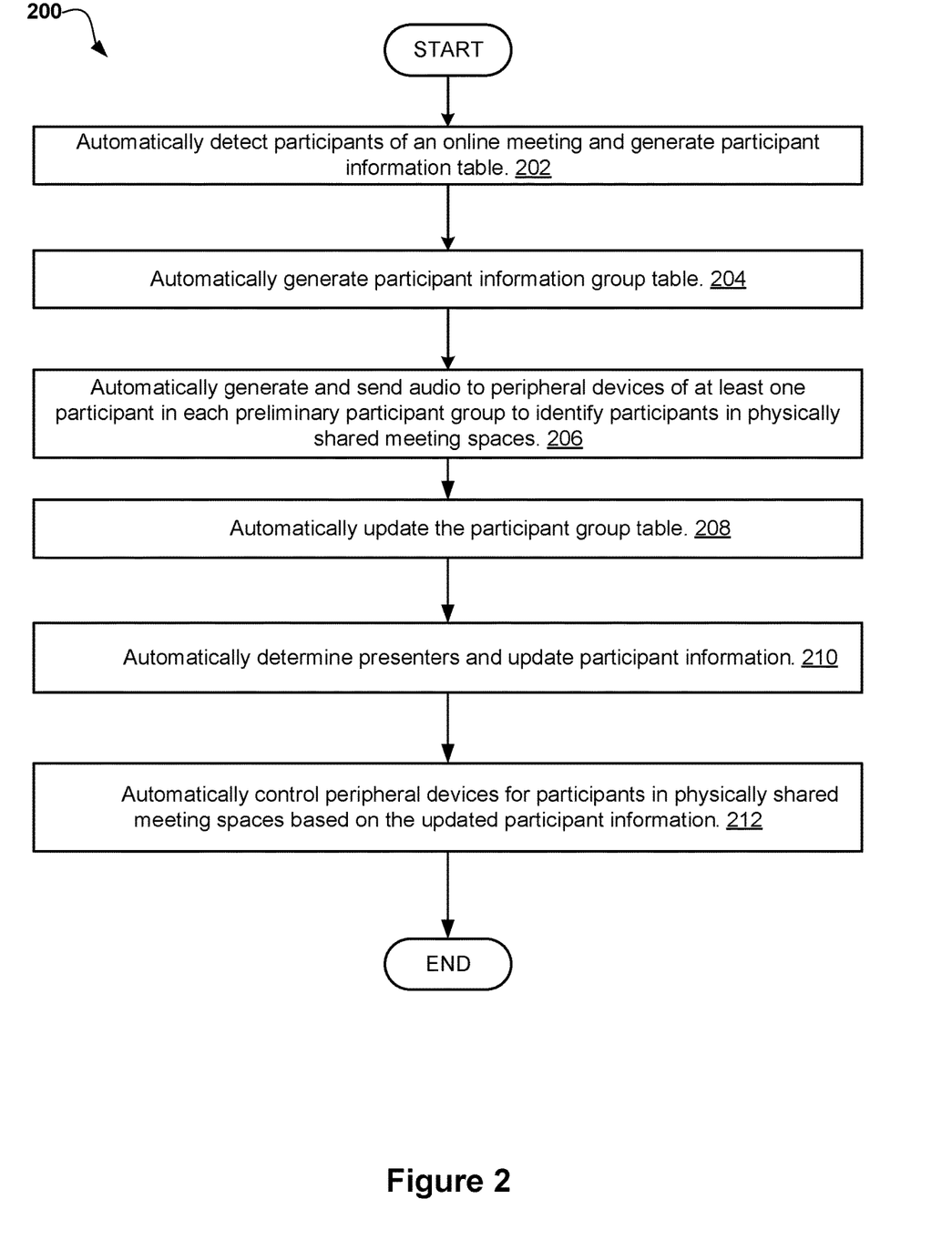
FIG. 2 illustrates an operational flowchart for a process of automatically controlling peripheral devices based on online meeting participant information according to at least one embodiment.

Referring now to FIG. 2, an operational flowchart for flowchart for a process 200 of automatically controlling peripheral devices based on online meeting participant information according to at least one embodiment is provided.

Figure 3:
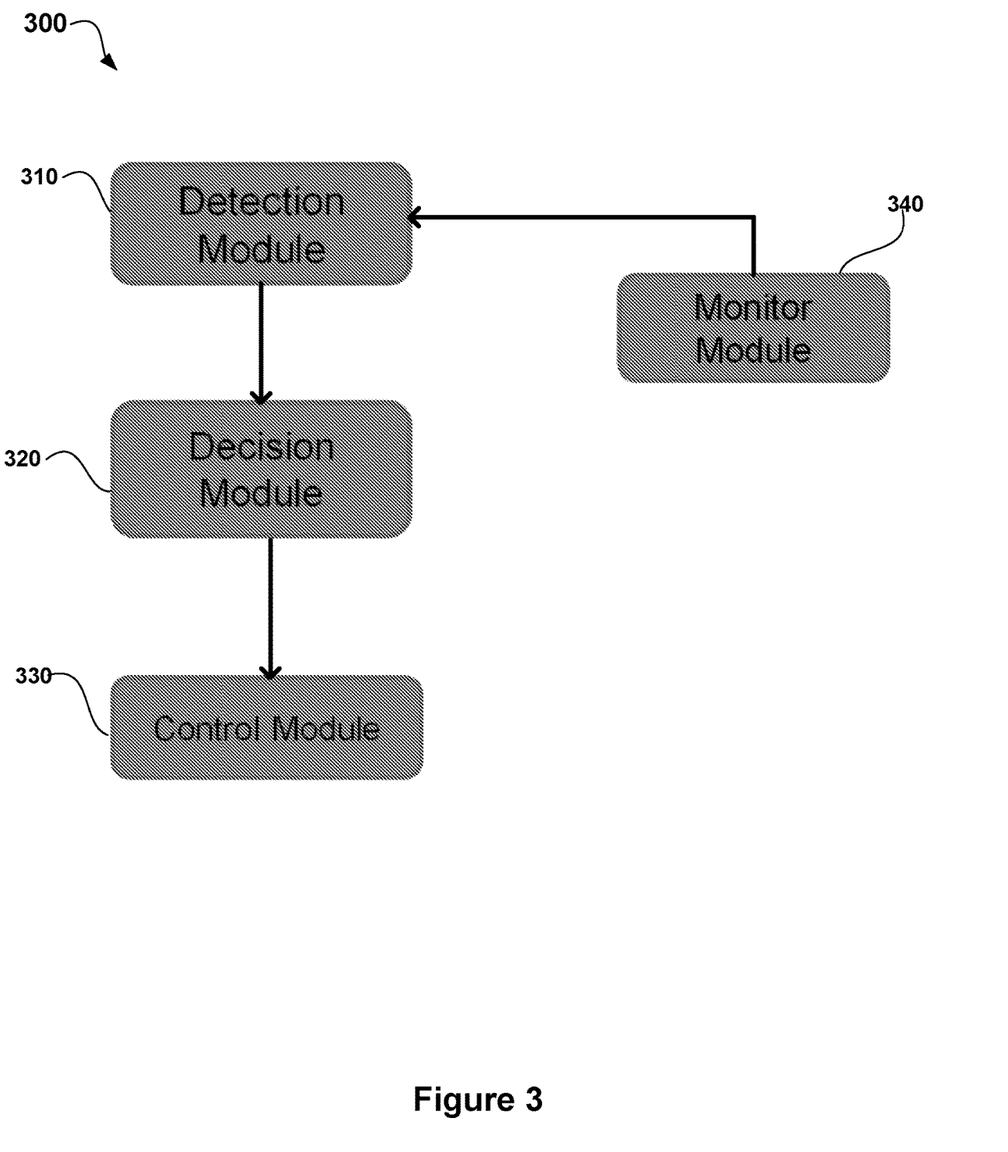
FIG. 3 depicts exemplary architecture that may be used in an illustrative process of automatically controlling peripheral devices based on online meeting participant information according to at least one embodiment.

Illustrative embodiments capable of performing process 200 may include exemplary system architecture 300 as depicted in FIG. 3. For example, described embodiments may include a detection module 310 for determining which participants are in a shared space, decision module 320 for determining presenter participants and non-presenter participants, a control module 330 for controlling and enabling or disabling peripheral devices of meeting participants, and an update module 340 for continuously identifying additional participants and ensuring participant information is continuously updated. The exemplary architecture of FIG. 3 will be referenced and described in further detail below in connection with the description of process 200 in FIG. 2.

Figure 4:
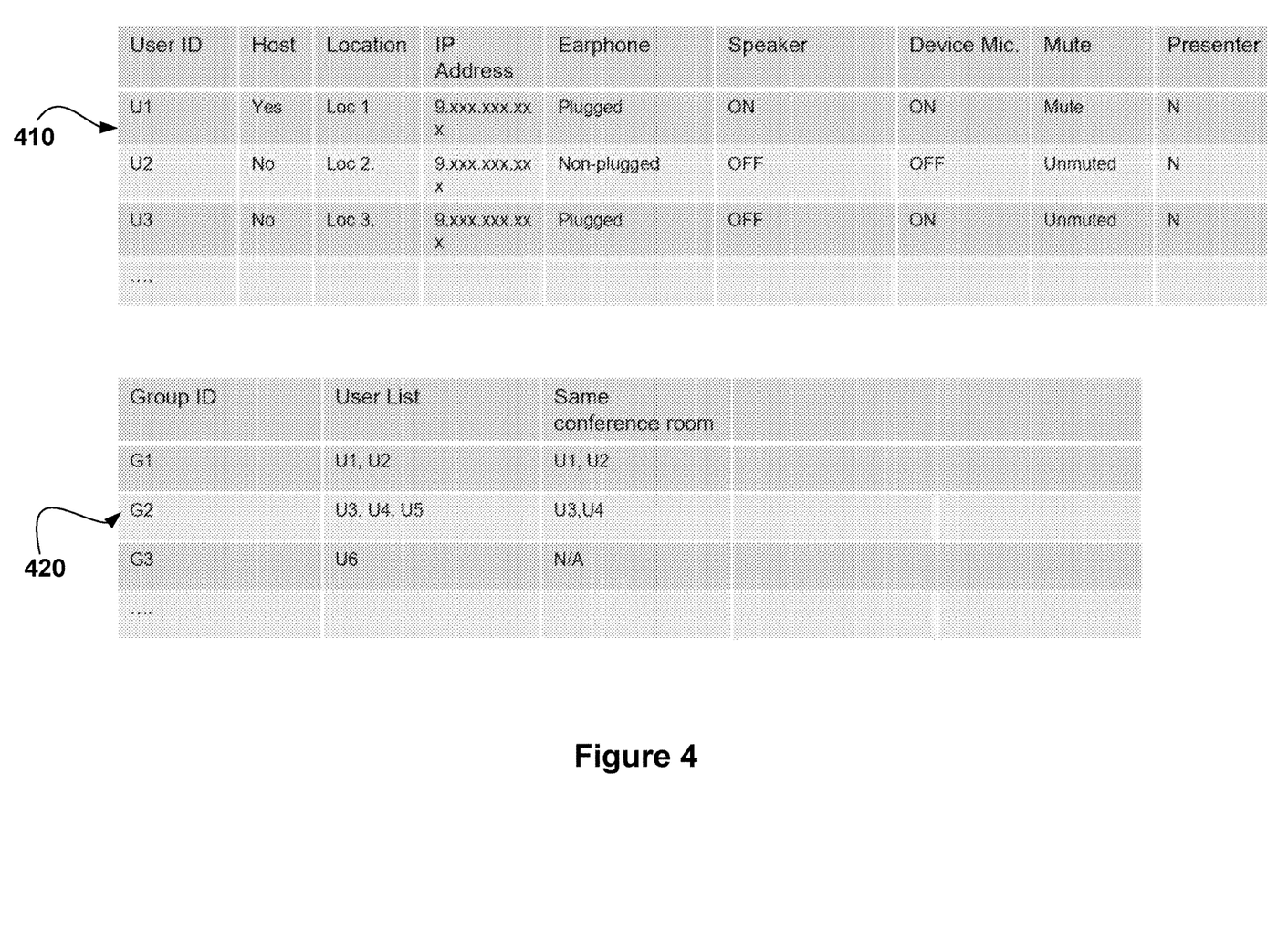
FIG. 4 depicts an illustrative participant information table and participant group table that may be generated using an illustrative process of automatically controlling peripheral devices based on online meeting participant information according to at least one embodiment.

At 202, online meeting management program 150 may automatically detect participants of an online meeting and generate a participant information table including participant information. Online meeting management program 150 may be configured to be employed with a variety of online meeting platforms. In embodiments, once an online meeting has started, online meeting management program 150 may, for example, utilize an illustrative detection module 310 to detect participants of the online meeting. Online meeting management program 150 may then generate a participants information table including information for each participant detected. As depicted in FIG. 4, an exemplary participant information table 410 may include columns for data including, for example, user identification numbers or tags, whether the user is a host of a given meeting, user location, user peripheral device information, user peripheral device status (enabled or disabled, on/off, etc.), user meeting platform information, whether the user is presenting or sharing content, and any other suitable user information or data that may be useful.

Next, at 204, online meeting management program 150 may automatically generate a participant group table including one or more preliminary participant groups based on the participant information from the generated participant information table generated at 202. Online meeting management program 150 may be configured to determine preliminary participant groups based upon certain participant information or data contained in the participant information table such as, for example, participant location, participant internet protocol (IP) address, or any other participant information or data that may be indicative of multiple participants sharing a common meeting location or space. An exemplary participant group table 420 is depicted in FIG. 4. In exemplary participant group table 420, a first preliminary participant group G1 includes users 'U1' and U2', and a second preliminary participant group includes users 'U3', 'U4', and 'U5'.

At 206, online meeting management program 150 may automatically generate and send audio through peripheral devices associated with at least one participant in each of the one or more preliminary participant groups to identify the participants in physically shared meeting spaces. In the context of this disclosure, a peripheral device, as used in connection with step 206 and step 212 below, may include any internal or external device connected to a participant's computer (or phone, or other digital device used to participate in an online meeting) that are controlled by the participant's computer but are not part of the computer system itself. Exemplary peripheral devices used for online meetings may include, for example, microphones, speakers, webcams, headsets, keyboards, mice, monitors, and any other known peripherals that may be used in the context of online meetings. At 206, online meeting management program 150 may employ exemplary detection module 310 to use the preliminary participant groups as a basis for generating and sending audio through the peripheral devices of one or more participants in a preliminary participant group to confirm which participants in the preliminary participant groups are in physically shared meeting spaces. According to one embodiment, a physically shared meeting space may, for example, include a physical space, room, or environment where audio from a first peripheral device associated with one or more participants can be detected (or heard) by a second peripheral device associated with other participants based on a location and/or range of the first peripheral device to the second peripheral device as may be confirmed by the online meeting management program 150.

In other words, at step 206, online meeting management program 150 may send audio through a peripheral device associated with a first participant in a given preliminary participant group to determine if the audio is then detected by peripheral devices associated with one or more other participants in the same given preliminary participant group. For example, for a preliminary participant group G2, management program 150 may send audio to the speaker (peripheral device) associated with a first participant or user 'U3' and subsequently detect the audio being detected or received by a microphone associated with a second participant or user 'U4'. Accordingly, online meeting management program 150 will make a secondary determination that participants/users 'U3' and 'U4' are indeed in a shared space or conference room that may be subject to audio echo or feedback. Online meeting management program 150 has thus determined that users 'U3' and 'U4' belong to a shared confirmed participant group. Online meeting management program 150 may systematically repeat the secondary determination step to determine a confirmed participant group for each detected participant.

At 208, online meeting management program 150 automatically update the participant group table to include confirmed participant groups based on the identified participants in the physically shared meeting spaces. At this step, online meeting management program 150 essentially updates the preliminary participant groups generated at step 204 based on the additional information gathered by online meting management program 150 at step 206. In the context of this disclosure, 'confirmed participant groups' refers to participant groups included in the participant group table for which physical meeting spaces of each of the meeting participants have been confirmed. For example, online meeting management program 150 may update an exemplary participant table to include confirmed participant groups within a separate column entitled 'Shared Conference Room' as shown in participant table 420. In the example shown in participant table 420, the preliminary participant group G2 includes users 'U3', 'U4', and 'U5'. However, online meeting management program 150 may utilize an exemplary detection module 310 at step 206 to determine (using the audio feedback tests described above) that only users 'U3' and 'U4' shared a physical meeting space, while user 'U5' is actually not in a shared physical meeting space with users 'U3' and 'U4'. Accordingly, at step 208, online meeting management program 150 would update participant group table 420 to include the confirmed participant groups in the 'Shared Conference Room' column, indicating that users 'U3' and 'U4' share a physical meeting space, and therefore, a confirmed participant group.

At 210, online meeting management program 150 may automatically determine a presenter for each of the confirmed participant groups and update the participant information based on the determined presenters. In embodiments, online meeting management program 150 may be configured to utilize an exemplary decision module 320 to first identify any participant that is listed as a host of the online meeting (as may be listed or previously identified in the participant information tables generated at step 202), and then set the host as a presenter by default by updating an appropriate column of the participant information table designating which participant is the presenter accordingly. In embodiments, if there is no participant identified as a meeting host, online meeting management program 150 may be configured to then determine the presenter in real-time by presenting an interactable 'Presenter' button to participants in each confirmed participant group via a suitable meeting platform or application and subsequently updating the participant information by setting the participant who interacts with the 'Presenter' button as the presenter. Online meeting management program 150 may set a manually identified participant as the presenter, for example, by updating the participant information table to identify the presenter with a presenter tag.

At 212, online meeting management program 150 may automatically control, for the confirmed participant groups, the peripheral devices of the identified participants in the physically shared meeting spaces based on the updated participant information. At this step, online meeting management program 150 may utilize exemplary control module 430 to control the peripheral devices associated with each participant within a confirmed participant group to prevent any 'noise' including any audio feedback or echo. For example, for an exemplary confirmed participant group A (in which the participants have been confirmed to be sharing a physically meeting space, as described and explained above), an exemplary control module 430 employed by online meeting management program 150 may check the participant information table for a participant in confirmed participant group A having a presenter tag indicating that they are the presenter. Control module 430 may then automatically turn on the peripheral devices (microphones, speakers, etc.) for the presenter in the confirmed participant group A, and then automatically mute the peripheral devices for the remaining participants in the confirmed participant group A. In embodiments, control module 430 may activate and begin controlling participant peripheral devices once a meeting has started. Control module 430 may also be configured to perform the above tasks upon receiving updated participant information from decision module 420 or a monitor module 440 that may be configured to monitor the system for certain changes, such as, for example, new participants joining, participant status changing, or manual presenter switches indicated by participant interaction with a 'Presenter' button as discussed above.

It will be appreciated that online meeting management program 150 thus provides for improved experiences of online meeting participants by automatically controlling peripheral hardware based on participant information. Described embodiments provide for an automated system that does not require manual action be taken by online meeting participants to avoid audio echo or feedback and avoid reliance on echo reduction or noise suppression techniques. Furthermore, the described embodiments perform actions to ensure accurate determinations of which online meeting participants belong to a shared group and which participant is a presenter, thereby allowing the described embodiments to provide for improved automated controlling of participant peripheral devices for a series of online meeting participants sharing a common meeting space.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of automatically controlling peripheral devices based on online meeting participant information comprising:
   automatically detecting participants of an online meeting and generating a participant information table comprising participant information;
   automatically generating a participant group table including one or more preliminary participant groups based on the participant information from the generated participant information table;
   automatically generating and sending audio through peripheral devices associated with at least one participant in each of the one or more preliminary participant groups to identify the participants in physically shared meeting spaces;
   automatically updating the participant group table to include confirmed participant groups based on the identified participants in the physically shared meeting spaces;
   automatically determining presenters for each of the confirmed participant groups and updating the participant information based on the determined presenters; and
   automatically controlling, for the confirmed participant groups, the peripheral devices of the identified participants in the physically shared meeting spaces based on the updated participant information.

2. The computer-based method of claim 1, wherein the participant information in the generated participant information table comprises one or more of participant location information and participant internet protocol address information.

3. The computer-based method of claim 1, wherein automatically determining the presenter for each of the confirmed participant groups and updating the participant information based on the determined presenters further comprises:
- automatically determining whether an identified host is included in the participant information table for the online meeting; and
- in response to determining that the identified host is included in the participant information table, automatically tagging the identified host as a default presenter.

4. The computer-based method of claim 3, wherein automatically determining the presenter for each of the confirmed participant groups and updating the participant information based on the determined presenters further comprises:
- automatically presenting an interactable button to the participants in each of the confirmed participant groups; and
- automatically tagging a manually identified participant as the presenter.

5. The computer-based method of claim 1, wherein automatically controlling, for the confirmed participant groups, the peripheral devices of the identified participants in the physically shared meeting spaces based on the updated participant information further comprises:
- automatically enabling the peripheral devices of the determined presenters.

6. The computer-based method of claim 5, further comprising:
- automatically disabling the peripheral devices of non-presenter participants.

7. The computer-based method of claim 1, further comprising:
- automatically employing a monitor module to detect new participants, updated participant information, and manual presenter updates automatically and continuously.

8. A computer system, the computer system comprising:
- one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
- automatically detecting participants of an online meeting and generating a participant information table comprising participant information;
- automatically generating a participant group table including one or more preliminary participant groups based on the participant information from the generated participant information table;
- automatically generating and sending audio through peripheral devices associated with at least one participant in each of the one or more preliminary participant groups to identify the participants in physically shared meeting spaces;
- automatically updating the participant group table to include confirmed participant groups based on the identified participants in the physically shared meeting spaces;
- automatically determining presenters for each of the confirmed participant groups and updating the participant information based on the determined presenters; and
- automatically controlling, for the confirmed participant groups, the peripheral devices of the identified participants in the physically shared meeting spaces based on the updated participant information.

9. The computer system of claim 8, wherein the participant information in the generated participant information table comprises one or more of participant location information and participant internet protocol address information.

10. The computer system of claim 8, wherein automatically determining the presenter for each of the confirmed participant groups and updating the participant information based on the determined presenters further comprises:
- automatically determining whether an identified host is included in the participant information table for the online meeting; and
- in response to determining that the identified host is included in the participant information table, automatically tagging the identified host as a default presenter.

11. The computer system of claim 10, wherein automatically determining the presenter for each of the confirmed participant groups and updating the participant information based on the determined presenters further comprises:
- automatically presenting an interactable button to the participants in each of the confirmed participant groups; and
- automatically tagging a manually identified participant as the presenter.

12. The computer system of claim 8, wherein automatically controlling, for the confirmed participant groups, the peripheral devices of the identified participants in the physically shared meeting spaces based on the updated participant information further comprises:
- automatically enabling the peripheral devices of the determined presenters.

13. The computer system of claim 12, further comprising:
- automatically disabling the peripheral devices of non-presenter participants.

14. The computer system of claim 8, further comprising:
- automatically employing a monitor module to detect new participants, updated participant information, and manual presenter updates automatically and continuously.

15. A computer program product, the computer program product comprising:
- one or more non-tangible computer-readable storage media and program instructions stored on at least one of the one or more non-tangible computer-readable storage media, the program instructions executable by a processor capable of performing a method, the method comprising:
- automatically detecting participants of an online meeting and generating a participant information table comprising participant information;
- automatically generating a participant group table including one or more preliminary participant groups based on the participant information from the generated participant information table;
- automatically generating and sending audio through peripheral devices associated with at least one participant in each of the one or more preliminary participant groups to identify the participants in physically shared meeting spaces;

automatically updating the participant group table to include confirmed participant groups based on the identified participants in the physically shared meeting spaces;

automatically determining presenters for each of the confirmed participant groups and updating the participant information based on the determined presenters; and automatically controlling, for the confirmed participant groups, the peripheral devices of the identified participants in the physically shared meeting spaces based on the updated participant information.

16. The computer program product of claim 15, wherein the participant information in the generated participant information table comprises one or more of participant location information and participant internet protocol address information.

17. The computer program product of claim 15, wherein automatically determining the presenter for each of the confirmed participant groups and updating the participant information based on the determined presenters further comprises:

automatically determining whether an identified host is included in the participant information table for the online meeting; and in response to determining that the identified host is included in the participant information table, automatically tagging the identified host as a default presenter.

18. The computer program product of claim 17, wherein automatically determining the presenter for each of the confirmed participant groups and updating the participant information based on the determined presenters further comprises:

automatically presenting an interactable button to the participants in each of the confirmed participant groups; and automatically tagging a manually identified participant as the presenter.

19. The computer program product of claim 15, wherein automatically controlling, for the confirmed participant groups, the peripheral devices of the identified participants in the physically shared meeting spaces based on the updated participant information further comprises:

automatically enabling the peripheral devices of the determined presenters.

20. The computer program product of claim 15, further comprising:

automatically employing a monitor module to detect new participants, updated participant information, and manual presenter updates automatically and continuously.

* * * * *